United States Patent [19]

Mills et al.

[11] Patent Number: 5,610,222
[45] Date of Patent: Mar. 11, 1997

[54] POLYMERIC FILM

[75] Inventors: Paul D. A. Mills, Darlington, United Kingdom; Junaid A. Siddiqui, Richmond, Va.; Karl Rakos, Chilton, United Kingdom

[73] Assignee: Imperial Chemical Industries PLC, London, England

[21] Appl. No.: 312,757

[22] Filed: Sep. 27, 1994

Related U.S. Application Data

[62] Division of Ser. No. 271,138, Jul. 7, 1994.

[51] Int. Cl.$^6$ ........................................... C08K 3/34
[52] U.S. Cl. ..................... 524/493; 524/539; 524/604; 524/605; 525/446; 525/474
[58] Field of Search .................... 524/493, 604, 524/605, 539; 525/474, 446

[56]  References Cited

U.S. PATENT DOCUMENTS

| | | | |
|---|---|---|---|
| 4,761,327 | 8/1988 | Hamano et al. | 524/539 |
| 4,849,564 | 7/1989 | Shimizu et al. | 525/476 |
| 4,921,670 | 5/1990 | Dallmann et al. | 525/474 |
| 5,137,939 | 8/1992 | Siddiqui | 524/493 |

FOREIGN PATENT DOCUMENTS

| | | | |
|---|---|---|---|
| 0229670 | 10/1992 | European Pat. Off. | |
| 64-11135 | 1/1989 | Japan | 524/493 |
| 838708 | 6/1960 | United Kingdom . | |

OTHER PUBLICATIONS

Derwent Publications, Ltd., London, GB, Abstract JP-A-63 017 962, Jan. 25, 1988.

*Primary Examiner*—Mark D. Sweet
*Attorney, Agent, or Firm*—Cushman Darby & Cushman IP Group Pillsbury Madison & Sutro LLP

[57]  ABSTRACT

A polymeric film comprising from 0.0005% to 2% by weight, based upon the weight of the polymer in the film, of filler particles having a volume distributed median particle diameter of from 0.1 to 12.5 µm, the filler particles being obtainable by calcining precursor silicone resin particles prior to incorporation into the film polymer.

13 Claims, No Drawings

POLYMERIC FILM

This application is a divisional application of Ser. No. 08/271,138 filed Jul. 7, 1994.

This invention relates to a polymeric film, and in particular to a polymeric film containing filler particles.

It is known that polymeric films often have poor handling properties which may result in difficulties in winding the films into high quality reels and inefficient passage through processing, for example, slitting, equipment. Film handling properties can be improved by increasing the surface roughness of the film, suitably by the use of coatings, or alternatively by incorporating fillers, i.e. organic and/or inorganic particles into the film. A combination of coatings and fillers may be used to improve film handling properties. The problem with using coatings to improve film handleability is that they limit the range of uses to which the film my be applied because of the difficulty in applying additional coating layers which may be required, for example, to provide antistatic, adhesion promoting or release properties. Filler incorporated into a coating layer is susceptible to abrasion and loss from the coating layer.

A wide range of fillers have been incorporated into films to improve handling properties, such as titanium dioxide, calcium carbonate, glass, barium sulphate, silica, kaolin, china clay, zeeospheres and calcium phosphates.

There is a requirement for filler particles to be of uniform particle size, and preferably spherical in shape in order to produce a film having a uniform surface roughness. Various types of silica particles are commercially available. However, the aforementioned silica particles are generally lacking in at least one property required, such as particle size and uniformity thereof, spherical shape, of a filler to meet the strict requirements of many polymeric film applications. In particular, there is a lack of commercial availability of uniform spherical particles of silica of relatively large particle size, for example greater than 2 to 3 μm.

European Patent No 229670 discloses a polyester film comprising 0.005% to 1% of silicone resin particles having an average particle diameter of 0.01 μm to 4 μm. The film is used in magnetic recording media. Unfortunately, the silicone resin particles disclosed therein are very hydrophobic and can be difficult to incorporate uniformly into polymeric films.

The presence of fillers in polymeric films result in a depreciation in the optical clarity and an increase in the haze, of the film.

Optical clarity and transparency are important criteria in a wide range of film applications, such as packaging, metallised films, reprographic films and films for general industrial use. There is a continuing need for films exhibiting high light transmittance, low haze and excellent handling properties.

We have surprisingly reduced or substantially overcome one or more of the aforementioned problems.

Accordingly, the present invention provides a polymeric film comprising from 0.0005% to 2% by weight, based upon the weight of the polymer in the film, of filler particles having a voltune distributed median particle diameter of from 0.1 to 12.5 μm, the filler particles being obtainable by calcining precursor silicone resin particles prior to incorporation into the film polymer.

The invention also provides a method of producing a polymeric film comprising from 0.0005% to 2% by weight, based upon the weight of the polymer in the film, of filler particles having a volume distributed median particle diameter of from 0.1 to 12.5 μm, wherein the filler particles are prepared by calcining precursor silicone resin particles, prior to incorporation into the film polymer, at a temperature of at least 250° C.

The polymeric film is a self-supporting film, i.e. a self-supporting structure capable of independent existence in the absence of a supporting base.

The polymeric film according to the invention may be formed from any synthetic, film-forming, polymeric material. Suitable thermoplastics, synthetic, materials include a homopolymer or a copolymer of a 1-olefine, such as ethylene, propylene or butene-1, a polyamide, a polycarbonate, and particularly a synthetic linear polyester which my be obtained by condensing one or more dicarboxylic acids or their lower alkyl (up to 6 carbon atoms) diesters, e.g. terephthalic acid, isophthalic acid, phthalic acid, 2,5-, 2,6- or 2,7-naphthalenedicarboxylic acid, succinic acid, sebacic acid, adipic acid, azelaic acid, 4,4'-diphenyldicarboxylic acid, hexahydro-terephthalic acid or 1,2-bis-p-carboxyphenoxyethane (optionally with a monocarboxylic acid, such as pivalic acid) with one or more glycols, e.g. ethylene glycol, 1,3-propanediol, 1,4-butanediol, neopentyl glycol and 1,4-cyclohexanedimethanol. A polyethylene terephthalate or polyethylene naphthalate film is preferred. A polyethylene terephthalate film is particularly preferred, especially such a film which has been biaxially oriented by sequential stretching in two mutually perpendicular directions, typically at a temperature in the range 70° to 125° C., and preferably heat set, typically at a temperature in the range 150° to 250° C., for example as described in British patent 838708.

The polymeric film may also comprise a polyarylether or thio analogue thereof, particularly a polyaryletherketone, polyarylethersulphone, polyaryletheretherketone, polyaryletherethersulphone, or a copolymer or thioanalogue thereof. Examples of these polymers are disclosed in EP-A-1879, EP-A-184458 and U.S. Pat. No. 4,008,203. The polymeric film may comprise a poly(arylene sulphide), particularly poly-p-phenylene sulphide or copolymers thereof. Blends of the aforementioned polymers may also be employed.

Suitable thermoset resin polymeric materials include addition-polymerisation resins—such as acrylics, vinyls, bis-maleimides and unsaturated polyesters; formaldehyde condensate resins—such as condensates with urea, melamine or phenols, cyanate resins, functionalised polyesters, polyamides or polyimides.

The polymeric film according to the invention may be unoriented, or uniaxially oriented, but is preferably biaxially oriented by drawing in two mutually perpendicular directions in the plane of the film to achieve a satisfactory combination of mechanical and physical properties. Simultaneous biaxial orientation may be effected by extruding a polymeric tube which is subsequently quenched, reheated and then expanded by internal gas pressure to induce transverse orientation, and withdrawn at a rate which will induce longitudinal orientation. Sequential stretching may be effected in a stenter process by extruding the thermoplastics polymer as a flat extrudate which is subsequently stretched first in one direction and then in the other mutually perpendicular direction. Generally, it is preferred to stretch firstly in the longitudinal direction, i.e. the forward direction through the film stretching machine, and then in the transverse direction. A stretched film my be, and preferably is, dimensionally stabilised by heat-setting under dimensional restraint at a temperature above the glass transition temperature thereof.

Filler particles, for incorporation into a polymeric film according to the invention, can be suitably prepared by calcining precursor silicone resin particles. The precursor silicone resin particles preferably comprise a three-dimensional polymer chain structure of the formula

wherein x is greater than or equal to 1, preferably from 1 to 1.9, more preferably 1 to 1.5, and particularly 1 to 1.2. R represents an organic group, such as an aliphatic hydrocarbon, e.g. methyl, ethyl or butyl group, or an aromatic hydrocarbon, e.g. phenyl group, or an unsaturated hydrocarbon, e.g. vinyl group. In a preferred embodiment of the invention R represents a hydrocarbon group having from 1 to 8, more preferably 1 to 5 carbon atoms. In a particularly preferred embodiment of the invention R represents a methyl group. R may comprise a mixture of any two or more of the aforementioned hydrocarbon groups. Particularly preferred precursor silicone resin particles comprise methyl sesquioxane.

The precursor silicone resin particles suitably have a cross-linked network of siloxane linkages, comprising a mixture of the structures

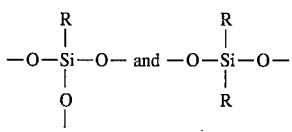

wherein R is as defined above.

Suitable precursor silicone resin particles are commercially available, for example "Tospearl" silicone resin particles available from Toshiba Silicone Co Ltd, Japan.

Calcining of precursor silicone resin particles results in elimination of the organic K group and hence a reduction in the value of x in the formula $R_xSiO_{2-(x/2)}$. When all the organic material has been removed x=0, and the result is silica particles ($SiO_2$).

Calcining is suitably achieved by heating the precursor silicone resin particles at a temperature greater than 250° C., preferably from 270° C. to 650° C., more preferably from 280° C. to 500° C., particularly from 290° C. to 400° C., and especially 300° C. to 350° C. The silicone resin particles are preferably heated for at least 1 hour, more preferably for 2 to 12 hours, particularly 3 to 8 hours, and especially 3 to 5 hours. The silicone resin particles are preferably heated in an oven in an atmosphere of air, or alternatively in a suitable inert atmosphere, such as nitrogen gas.

Elimination of the organic material during calcination of the precursor silicone resin particles results in a reduction in weight of the particles. It is preferred that the silicone resin particles lose from 0% to 20%, more preferably up to 10%, particularly up to 5%, and especially up to 2% of the original weight thereof during the calcination process.

The calcined filler particles for use in a polymeric film according to the invention optionally contain an organic group. The ratio of organic groups, preferably methyl, to silicon atoms present in the calcined filler particles is preferably in the range from 0 to 0.9:1, more preferably 0.05 to 0.7:1, particularly 0.1 to 0.5:1, and especially 0.15 to 0.3:1.

The filler particles suitably comprise a three-dimensional polymer chain structure of the formula

wherein R represents an organic group as defined above for the precursor silicone resin particles. During calcination, at least in air, elimination of the R group and formation of Si-OH bonds and additional Si-O-Si bonds occurs. There are substantially no Si-OH bonds present in the precursor silicone resin particles. Further calcination results in conversion of the Si-OH bonds to Si-O-Si bonds and the eventual formation of silica particles. The value of x is preferably in the range from 0 to 0.9, more preferably 0.05 to 0.7, particularly 0.1 to 0.5, and especially 0.15 to 0.3. The value of y is preferably in the range from 0 to 1.2, more preferably from 0.2 to 1.0, particularly 0.4 to 0.8, and especially 0.5 to 0.7. The values of x and y can be determined, for example, by $^{29}Si$ magic angle spinning NMR spectroscopy.

The chemical composition of filler particles for use in the present invention is preferably from 80% to 100%, more preferably 90% to 99.9%, especially 92% to 98%, and particularly 94% to 97% by weight of inorganic material, and correspondingly preferably from 0% to 20%, more preferably 0.1% to 10%, especially 2% to 8%, and particularly 3% to 6% by weight of organic material. In a preferred embodiment of the invention the organic component of the filler particles comprises predominantly, and more preferably substantially, methyl groups. The inorganic component of the filler particles preferably comprises at least 98%, more preferably at least 99%, particularly at least 99.5%, and especially at least 99.9% of silica and/or hydroxylated silica, i.e. of silicon, oxygen and hydrogen atoms.

In order to obtain the advantageous properties of the present invention the concentration of filler particles, as defined herein, present in the polymeric film should be in the range from 0.0005% to 2%, preferably 0.001% to 0.5%, more preferably 0.0025% to 0.1%, particularly 0.004% to 0.02%, and especially 0.005% to 0.01% by weight, based upon the weight of the polymer in the film. The aforementioned preferred concentration ranges are particularly applicable to a filled monofilm. However, a polymeric film according to one embodiment of the invention is a composite film having a first layer, preferably essentially unfilled, and on at least one surface thereof a second layer preferably comprising in the range from 0.02% to 0.5%, more preferably 0.04% to 0.3%, and particularly 0.05% to 0.08% by weight of filler particles, based upon the weight of the polymer in the second layer.

The volume distributed median particle diameter (equivalent spherical diameter corresponding to 50% of the volume of all the particles, read on the cumulative distribution curve relating volume % to the diameter of the particles—often referred to as the "D(v,0.5)" value) of the filler particles incorporated into the polymeric film according to the invention is in a range from 0.1 to 12.5 μm, preferably 0.4 to 8.0 μm, more preferably 0.7 to 6.0 μm, particularly 1.8 to 5.0 μm, and especially 2.8 to 4.5 μm.

The size distribution of the filler particles is also an important parameter in obtaining a polymeric film having a uniform surface roughness. The filler particles have a particle size distribution ratio $D_{25}/D_{75}$ (where $D_{25}$ and $D_{75}$, respectively, are the particle diameter of 25% and 75% of a volume based cumulative particle size distribution curve) value of from 1.1 to 1.6, preferably 1.15 to 1.5, more preferably 1.2 to 1.4, and especially 1.25 to 1.35. In a preferred embodiment of the invention the filler particles also have a particle size distribution ratio $D_{10}/D_{90}$ (where $D_{10}$ and $D_{90}$, respectively, are the particle diameter of 10% and 90% of a volume based cumulative particle size distribution curve) value of from 1.2 to 2.2, preferably 1.3 to 2.0, more preferably 1.5 to 1.9, and especially 1.7 to 1.8.

The presence of excessively large filler particles can result in the film exhibiting unsightly 'speckle', i.e. where the presence of individual filler particles in the film can be discerned with the naked eye. Desirably, therefore, the actual particle size of 99.9% by volume of the particles should not exceed 20 μm, and preferably not exceed 15 μm. Preferably at least 90%, more preferably at least 95% by volume of the particles are within the range of the volume distributed median particle diameter ±1.5 μm, especially ±1.0 μm and particularly ±0.5μm.

Particle sizes of the particles may be measured by electron microscope, Coulter counter, sedimentation analysis and light scattering, preferably techniques based on laser light diffraction.

The filler particles for use in the present invention are of substantially, circular cross-section irrespective of the selected viewing point. The particles exhibit an average aspect ratio $d_1:d_2$ (where $d_1$ and $d_2$, respectively, are the maximum and minimum dimensions of the particle) of from 1:1 to 1:0.9, preferably from 1:1 to 1:0.95, and especially from 1:1 to 1:0.98. The aspect ratio of a filler particle can be determined by measuring the $d_1$ and $d_2$ value of a filler particle selected from a photographic image obtained by using a scanning electron microscope. An average aspect ratio can be obtained by calculating the mean value of 100 typical filler particles.

In a particularly preferred embodiment of the invention, the filler particles have a BET specific surface area, measured as described herein, of less than 80, more preferably in the range from 3 to 50, particularly 5 to 45, and especially 15 to 40 $m^2/g$.

The filler particles preferably have a skeletal density, measured as described herein, in the range from 1.95 to 2.3, more preferably 2.00 to 2.2, and particularly 2.05 to 2.15 $g/cm^3$.

The filler particles may be added to the polymeric layer or polymeric layer-forming material at any point in the film manufacturing process prior to the extrusion of the polymer. For example, in the production of a preferred polyester film, the particles may be added during monomer transfer or in the autoclave, although it is preferred to incorporate the particles as a glycol dispersion during the esterification reaction stage of the polyester synthesis. Alternatively, the particles may be added as a dry powder into the polymer melt via a twin-screw extruder or by masterbatch technology.

The polymeric film of the present invention is suitably transparent, preferably having a wide angle haze, measured as described herein, for a 75 μm thick film, of <10%, more preferably <5%, especially <2%, and particularly <1%.

The surface of a polymeric film according to the invention preferably exhibits a static coefficient of friction, measured as descibed herein, when measured against itself, of <0.9, preferably <0.7, especially <0.5, and particularly <0.4.

The layers of a film according to the invention may conveniently contain any of the additives conventionally employed in the manufacture of polymeric films. Thus, agents such as dyes, pigments, lubricants, anti-oxidants, anti-blocking agents, surface active agents, slip aids, gloss-improvers, prodegradants, ultra-violet light stabilisers, viscosity modifiers and dispersion stabilisers may be incorporated into the polymeric film layer(s), as appropriate. The additives will preferably not increase the wide angle haze of the polymeric film up to or above the aforementioned values.

A polymeric film according to the invention may be coated on one or both surfaces with one or more additional coating, ink, lacquer and/or metal layers, for example to form a laminate or composite which exhibits improved properties, such as antistatic, adhesion promoting or release, compared with the component materials. A preferred antistatic coating layer comprises a quaternary ammonium compound, preferably in combination with an acrylic resin.

Prior to the deposition of a coating medium onto the polymeric film, the exposed surface thereof may, if desired, be subjected to a chemical or physical surface-modifying treatment to improve the bond between that surface and the subsequently applied coating layer. A preferred treatment is corona discharge, which may be effected in air at atmospheric pressure with conventional equipment using a high frequency, high voltage generator, preferably having a power output of from 1 to 20 kw at a potential of 1 to 100 kv. Discharge is conveniently accomplished by passing the film over a dielectric support roller at the discharge station at a linear speed preferably of 1.0 to 500 m per minute. The discharge electrodes may be positioned 0.1 to 10.0 mm from the moving film surface. Alternatively, the surface of the film may be pretreated with an agent known in the art to have a solvent or swelling action on the polymeric layer. Examples of such agents which are particularly suitable for the treatment of a polyester film surface include a halogenated phenol dissolved in a common organic solvent e.g. a solution of p-chloro-m-cresol, 2,4-dichlorophenol, 2,4,5- or 2,4,6-trichlorophenol or 4-chlororesorcinol in acetone or methanol.

The coating medium may be applied to an already oriented polymeric film surface, but application of the coating medium is preferably effected before or during the stretching operation.

In particular, it is preferred that the coating medium should be applied to the film surface between the two stages (longitudinal and transverse) of a thermoplastics film biaxial stretching operation. Such a sequence of stretching and coating is especially preferred for the production of a coated polyester film comprising polyethylene terephthalate, which is preferably firstly stretched in the longitudinal direction over a series of rotating rollers, coated with the coating layer, and then stretched transversely in a stenter oven, preferably followed by heat setting.

Polymeric films according to the invention are suitable for use in a wide range of film applications, such as packaging, e.g. as carton windows, metallised films, reprographic films and films for general industrial use. Polymeric films described herein are particularly suitable for information storage and display, such as imaging, montage, masking, stencil, overhead projection, membrane touch switch, microfilm and printing, such as thermal wax transfer printing.

In this specification the following test methods have been used to determine certain properties of the filler particles and polymeric film:

Filler Particle Analysis

Volume distributed median particle diameter, and particle size distribution ratios $D_{25}/D_{75}$ and $D_{10}/D_{90}$ were measured using a Coulter LS130 (Coulter Electronics Ltd, Luton, UK) particle sizer.

BET specific surface area was measured by multi-point nitrogen adsorption using a Micromeritics ASAP 2400 (Micromeritics Limited, Dunstable, UK). Relative pressures between 0.05 and 0.21 were used, and the outgassing conditions were 1 hour at 140° C. with nitrogen purge (1 to 2 liters/hour).

Skeletal density was measured by helium pycnometry using a Micromeritics Accupyc 1330 (Micromeritics Limited, Dunstable, UK).

The ratio of methyl groups to silicon atoms was measured by $^{29}Si$ magic angle spinning NMR spectroscopy. The spectrum was acquired on a Bruker MSL200 NMR spectrometer operating at a frequency of 39.73 MHz for $^{29}Si$. The magic angle was set using KBr and the spinning speed was 5050 Hz. The NMR free induction decay consisting of 2K complex data points was acquired using the single pulse excitation pulse sequence together with high power 1H decoupling where the 1H decoupling field was of the order of 70 kHz. The spectral width was 20 kHz, $^{29}$Si pulse length 5.5 μs (90°) and recycle delay 60 s. 1000 transients were accumulated. Data processing consisted of apodisation using an exponential with the Bruker LB parameter equal to 60 Hz, followed by Fourier transformation, phasing, baseline correction and integration using the Bruker software EP-I routine.

Polymeric Film Analysis

The static coefficient of friction of the polymeric film was measured against itself by an inclined plane method based on ASTM test D 4518-87, using a Model IPST (Specialist Engineering, Welwyn, UK).

Wide angle haze was determined as the percentage of transmitted light which deviates from the normal to the surface of the film by an average amount greater than 2.5° of arc during passage through the film, essentially according to ASTM test D 1003-61, using a Hazegard XL211 Hazemeter (BYK Gardner, US).

The handling and winding properties of the film were evaluated on a slitting machine. Reels of length between 1000 m and 3000 m, and width between 500 mm and 2000 mm were slit at speeds between 50 and 400 meters per minute. The resultant slit reels were assessed for their physical appearance.

The invention is illustrated by reference to the following

EXAMPLE 1

Precursor silicone resin particles (Tospearl 145, supplied by Toshiba Silicone Co Ltd, Japan) were calcined by heating in an oven at 300° C. for 4 hours in an atmosphere of air in order to produce filler particles for use in the present invention. The resultant filler particles exhibited the following characteristics which were measured using the methods described herein:

(i) volume distributed median particle diameter=4.4 μm.
(ii) particle size distribution ratio $D_{25}/D_{75}$=1.40
(iii) particle size distribution ratio $D_{10}/D_{90}$=1.85
(iv) BET specific surface area=45 m$^2$/g
(v) skeletal density=2.06 g/cm$^3$
(vi) ratio of methyl groups to silicon atoms=0.2

Polyethylene terephthalate polymer containing approximately 600 ppm of filler particles, produced as described above by calcining precursor silicone resin particles, was extruded through a film-forming die onto a water cooled rotating, quenching drum to yield an amorphous cast composite extrudate. The cast extrudate was heated to a temperature of about 80° C. and then stretched longitudinally at a forward draw ratio of 3.2:1. The polymeric film was passed into a stenter oven, where the film was stretched in the sideways direction to approximately 3.4 times its original dimensions. The biaxially stretched polymeric film was heat set at a temperature of about 225° C. Final film thickness was approximately 188 μm.

We claim:

1. A method of producing a polymeric film comprising the steps of:

(i) calcining, at a temperature of at least 250° C., precursor silicone resin particles to produce calcined filler particles having a volume distributed median particle diameter of from 0.1 to 12.5 μm, (ii) mixing the calcined filler particles with polymer or polymer-forming material at a concentration of 0.0005% to 2% by weight, based upon the weight of the polymer, and (iii) extruding the polymer/calcined filler particle mixture to form a film.

2. A method according to claim 1 wherein the film is oriented by drawing in two mutually perpendicular directions.

3. A method according to claim 1 wherein the precursor silicone resin particles comprise a three-dimensional polymer chain structure of the formula $$R_xSiO_{2-(x/2)}$$

wherein x is greater than or equal to 1, and R represents an organic group.

4. A method according to claim 1 wherein the calcined filler particles comprise a three-dimensional polymer chain structure of the formula $$R_x(OH)_ySiO_{2-((x+y)/2)}$$

wherein x is in the range from 0 to 0.9, y is in the range from 0 to 1.2, and R represents an organic group.

5. A method according to claim 4 wherein x is in the range from 0.05 to 0.9.

6. A method according to claim 4 wherein x is in the range from 0.1 to 0.5.

7. A method according to claim 4 wherein y is in the range from 0.2 to 1.0.

8. A method according to claim 1 wherein the precursor silicone resin particles are heated at a temperature from 300° C. to 350° C. for 3 to 8 hours.

9. A method according to claim 1 wherein the polymer/calcined filler particle mixture additionally comprises at least one other additive conventionally employed in the manufacture of polymeric films.

10. A method according to claim 1 wherein the calcined filler particles have a BET specific surface area of less than 80 m$^2$/g.

11. A method according to claim 1 wherein the calcined filler particles have a volume distributed median particle diameter in the range from 2.8 to 4.5 μm.

12. A method according to claim 1 wherein the inorganic content of the calcined filler particles is at least 99.0% of the silica and/or hydroxylated silica.

13. A method according to claim 1 wherein the polymer is polyethylene terephthalate and/or polyethylene naphthalate.

* * * * *